United States Patent Office.

HENRY SALZER, OF BALTIMORE, MARYLAND.

ART OF PRESERVING MEAT.

SPECIFICATION forming part of Letters Patent No. 477,850, dated June 28, 1892.

Application filed October 21, 1891. Serial No. 409,408. (No specimens.)

*To all whom it may concern:*

Be it known that I, HENRY SALZER, a resident of Baltimore, in the State of Maryland, have invented a new and useful Improvement in the Art of Preserving Meat, which improvement is fully set forth in the following specification.

This invention has reference to the preservation of meat in a wholesome and natural state and more particularly to the general method of preservation described in Letters Patent Nos. 384,721 and 384,722, granted June 19, 1888. In pursuing my experiments in this line two essential conditions have been aimed at: first, to insure absolute wholesomeness and protection against micro-organisms, whose presence, even in freshly killed and cooked meat, cannot be entirely prevented; second, to preserve the exact flavor or taste of fresh meat. The nature of these considerations is such that an approximation to success, however close, will not satisfy the public want, while to insure their perfect fulfillment is a problem of very great difficulty.

By the methods of my former patents I have found it possible to exclude, effectually, all destructive organisms; but by no practical and economical means has it been found possible to prevent the meat from being affected in its delicacy of flavor by the paraffine, vaseline, or like inorganic material which formed part of the germ-proof envelope.

For the production, therefore, of high-class goods, suitable for family use, it has been found necessary to discover some plan whereby the natural animal fats could be used to envelop the meat and to fill the pores of the plaster and fabric shell. Theoretically the sterilization of meat in its own grease is the best method to insure preservation of flavor, and experiment amply demonstrates this to be a fact. The grease, however, is a conductor for bacilli through the pores of the shell, and meat so prepared, no matter how perfectly sterilized, is liable to attack, and may contain when used the germs of disease, though there be nothing in its appearance to indicate it. To provide security against bacilli in meat so prepared a method has been devised according to which the meat after being treated in a peculiar manner is finally inclosed in cans, which serve as the protection against noxious germs.

The specific object of the present invention is to avoid the expense of cans, the additional weight and bulk thereof, and the difficulty of opening such package. It also has the object of rendering unnecessary the special precautions required to prevent the contents of the package being affected in flavor by the metal of the can. I have succeeded in accomplishing these objects while fulfilling the essential conditions pointed out above by proceeding in the manner hereinafter described and substituting a pliable wrap of tin-foil for the metal can.

Attempt was first made simply to substitute for the can a wrap of tin-foil around the package prepared according to the former methods, and then sterilizing; but after a time samples so made were found defective. Investigation showed that during the sterilization the heated particles of fat produced in some cases microscopic holes through the double wrap of tin-foil, and hence opportunity for the admission of bacilli was presented. This difficulty is obviated, according to the present invention, by applying an absorbent wrap around the hot grease-saturated shell of fabric and plaster.

The improved process is carried out in the following ways: The meat is subjected to a preliminary steaming, pressed, and, enveloped in its wrap of plaster-of-paris, spread upon a suitable fabric. When this is dried, it is then thoroughly sterilized by immersing the package in fat of the same meat heated to the proper temperature for a sufficient length of time. During this operation the fat penetrates through the plaster shell, surrounds the inclosed piece of meat, and occupies all the pores and spaces of the package. So far the process is old. The package is now taken from the sterilizing-bath and immediately, while still hot and inaccessible to living germs, is coated with an absorbent material, for which purpose another layer of plaster is found to answer well. The heat of this package dries this coating almost instantly. The outside wrap of a double layer of tin-foil is then applied and the meat is subjected to a final sterilization for a short period of time. During this last step of the process the coating of plaster or like material absorbs the melted grease from the inner shell and prevents any injury to the outside wrap.

In carrying out the process I do not limit myself to the use of plaster-of-paris as the absorbent coating, since it is obvious that any material having similar properties may be employed without departing from the spirit of the invention.

I claim as my invention—

1. The improvement in the art of preserving meat, which consists in surrounding it with a wrapper of plaster-of-paris, sterilizing it in melted animal fat, then applying a coating of absorbent material, then a wrap of pliable material impermeable to air and water, and finally subjecting a second time to a sterilizing heat, substantially as described.

2. In the art of preserving meat, the improvement consisting in immersing a piece of meat surrounded by a plaster shell in heated animal fat, removing it therefrom after thorough sterilization, applying around it while hot an absorbent coating, inclosing in a wrap of metal foil, and finally sterilizing a second time, as set forth.

3. In the art of preserving meat, the improvement consisting in surrounding a piece of meat in a shell composed of fabric and plaster-of-paris, heating in a bath of animal fat, wrapping it in a pliable material impermeable to air and water, and finally subjecting a second time to a sterilizing heat, substantially as described.

4. A food-package comprising a piece of meat inclosed in a plaster shell impregnated with the fat of the meat and having around said plaster shell a coating of absorbent material, and an external wrapper of tin-foil, substantially as described.

In testimony whereof I have signed this specification in the presence of two subscribing witnesses.

HENRY SALZER.

Witnesses:
   THOS. KELL BRADFORD,
   LEE PURCELL.